United States Patent
Krieger et al.

(10) Patent No.: US 11,467,112 B2
(45) Date of Patent: Oct. 11, 2022

(54) METHOD FOR DETERMINING A QUALITY PROPERTY OF AN OPERATING LIQUID IN AN OPERATING LIQUID CONTAINER FOR A MOTOR VEHICLE, AND OPERATING LIQUID CONTAINER FOR CARRYING OUT THE METHOD

(71) Applicant: KAUTEX TEXTRON GmbH & Co. KG, Bonn (DE)

(72) Inventors: Karl-Ludwig Krieger, Brinkum (DE); Jakob Happel, Brinkum (DE); Hartmut Wolf, Konigswinter (DE)

(73) Assignee: KAUTEX TEXTRON GmbH & Co. KG, Bonn (DE)

( * ) Notice: Subject to any disclaimer, the term of this patent is extended or adjusted under 35 U.S.C. 154(b) by 0 days.

(21) Appl. No.: 16/958,603

(22) PCT Filed: Dec. 13, 2018

(86) PCT No.: PCT/EP2018/084746
§ 371 (c)(1),
(2) Date: Jun. 26, 2020

(87) PCT Pub. No.: WO2019/129500
PCT Pub. Date: Jul. 4, 2019

(65) Prior Publication Data
US 2020/0355639 A1      Nov. 12, 2020

(30) Foreign Application Priority Data
Dec. 28, 2017   (DE) .......................... 1020172238534

(51) Int. Cl.
*G01N 27/02*    (2006.01)
*G01N 27/22*    (2006.01)

(52) U.S. Cl.
CPC .......... *G01N 27/221* (2013.01); *G01N 27/026* (2013.01); *G01N 27/226* (2013.01); *G01N 27/228* (2013.01)

(58) Field of Classification Search
CPC .. G01N 27/221; G01N 27/026; G01N 27/226; G01N 27/228; G01N 27/22
See application file for complete search history.

(56) References Cited

U.S. PATENT DOCUMENTS

| | | | |
|---|---|---|---|
| 6,212,956 B1 | 4/2001 | Donald et al. | |
| 6,377,052 B1 | 4/2002 | McGinnis et al. | |

(Continued)

FOREIGN PATENT DOCUMENTS

| | | | |
|---|---|---|---|
| DE | 202011101482 U1 | 9/2012 | |
| EP | 2902774 | * 8/2015 | |

(Continued)

OTHER PUBLICATIONS

Translation of DE International Search Report dated May 31, 2019, from corresponding PCT Application PCT/EP2018/084746, 3 pages.

(Continued)

*Primary Examiner* — Feba Pothen
(74) *Attorney, Agent, or Firm* — Lee & Hayes, P.C.

(57) ABSTRACT

Methods for determining an electrical conductivity of an operating liquid in an operating liquid container for a motor vehicle. The operating liquid container includes at least one capacitor which is fastened to a container wall of the operating liquid container and has a first electrode and a second electrode opposite said first electrode. A first method determines the electrical conductivity of the operating liquid by means of a frequency-dependent phase progression of the impedance of the at least one capacitor. Another method determines the electrical conductivity of the operating liquid by means of a frequency-dependent capacitance profile of (Continued)

the at least one capacitor. An operating liquid container which is designed for carrying out the methods.

13 Claims, 6 Drawing Sheets

(56) References Cited

U.S. PATENT DOCUMENTS

| | | | |
|---|---|---|---|
| 8,854,058 B2 | 10/2014 | Katafuchi | |
| 9,465,000 B1* | 10/2016 | Brown | G01N 27/026 |
| 10,739,327 B2* | 8/2020 | Sun | F16N 19/003 |
| 2002/0118025 A1* | 8/2002 | Yamagishi | G01N 27/221 |
| | | | 324/672 |
| 2003/0046985 A1 | 3/2003 | Schoess | |
| 2003/0222656 A1 | 12/2003 | Phillips et al. | |
| 2004/0257094 A1 | 12/2004 | Halalay et al. | |
| 2005/0092606 A1* | 5/2005 | Reich | G01N 33/48707 |
| | | | 204/450 |
| 2005/0104607 A1 | 5/2005 | Byington et al. | |
| 2008/0143345 A1 | 6/2008 | Boudaoud et al. | |
| 2017/0020433 A1* | 1/2017 | Hotaling | A61B 10/007 |

FOREIGN PATENT DOCUMENTS

| | | | |
|---|---|---|---|
| EP | 2902774 A1 * | 8/2015 | G01N 27/026 |
| WO | WO2017142553 A1 | 8/2017 | |

OTHER PUBLICATIONS

Behzadi, G. et al., "Electrical Parameter and Permittivity Measurement of Water Samples Using the Capactive Sensor", International Journal of Water Resources and Environmental Sciences, 2013, 10 pages.

German Office Action from corresponding German patent application No. 102017223853.dated Dec. 28, 2017, 12 pages.

Rusiniak, Lech, "Electric Properties of Water. New Experimential Data in the 5hz—13 MHZ Frequency Range", vol. 52, No. 1 Acta Geophysica Polonica, 2004, 14 pages.

EP Office Action from corresponding EP Patent Application No. 18833845.3 dated Mar. 29, 2022, 3 pages.

* cited by examiner

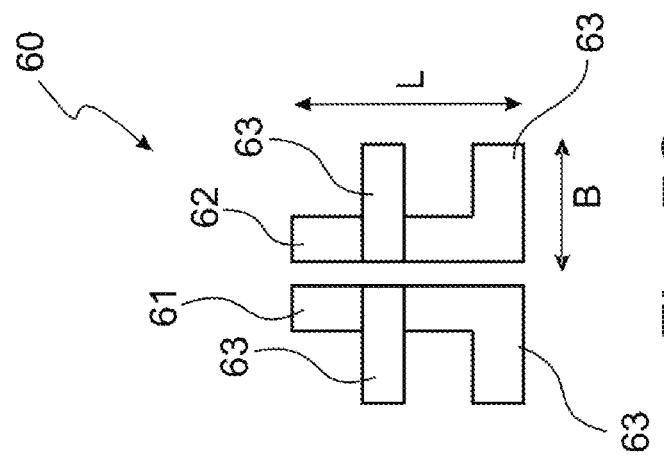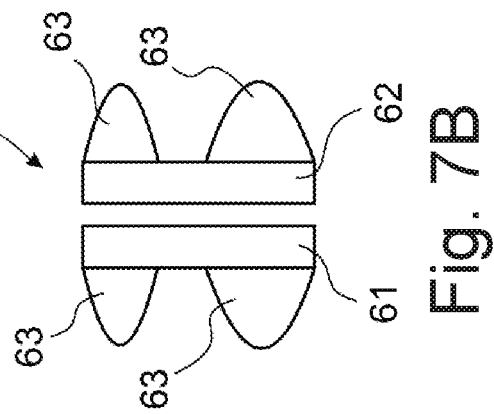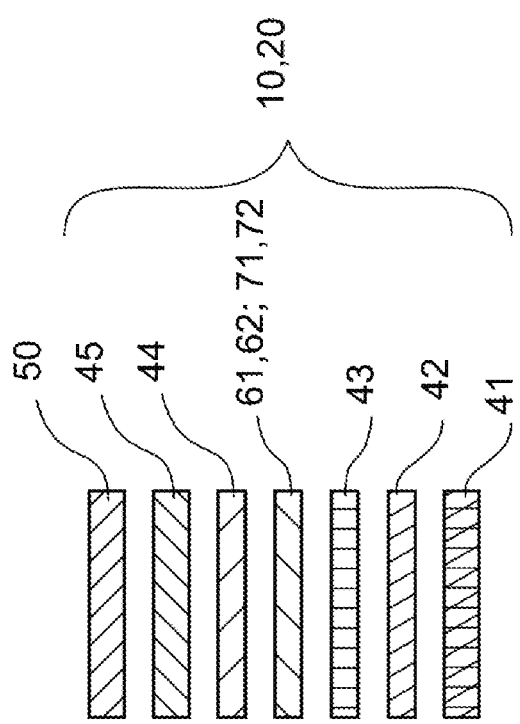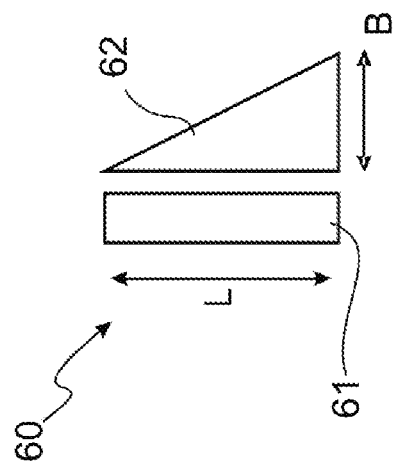

METHOD FOR DETERMINING A QUALITY PROPERTY OF AN OPERATING LIQUID IN AN OPERATING LIQUID CONTAINER FOR A MOTOR VEHICLE, AND OPERATING LIQUID CONTAINER FOR CARRYING OUT THE METHOD

CROSS-REFERENCE TO RELATED APPLICATIONS

This application claims priority to PCT Application No. PCT/EP2018/084746, filed Dec. 13, 2018, which claims priority to German Patent Application No. 10 2017 223 853.4, filed Dec. 28, 2017, the contents of each of which is incorporated herein by reference.

TECHNICAL FIELD

The present invention relates to a method for determining a quality property of an operating liquid in an operating liquid container for a motor vehicle. Furthermore, the present invention relates to an operating liquid container for carrying out the method.

BACKGROUND

Reference is also made hereinafter to operating liquid containers designed as water containers, which are designed for use in a motor vehicle. Operating liquid containers in the meaning of the invention are particularly but not exclusively water containers for motor vehicles for storing, for example, water to be injected into an intake manifold of an internal combustion engine, wiper water containers, urea containers, fuel containers (for gasoline fuels or diesel fuels), oil containers, secondary liquid containers, or additive containers for motor vehicles. Containers of the type mentioned at the outset are frequently produced by extrusion blow molding, wherein in particular HDPE (high-density polyethylene) is suitable for the production of extrusion-blow-molded containers. It is furthermore possible to produce corresponding operating liquid containers by means of an injection molding method.

Water injection is a method for increasing the performance of internal combustion engines. So as not to exceed the maximum temperature during ultrahigh performance, distilled water is injected into the intake manifold of an internal combustion engine. The evaporating liquid has a cooling effect and reduces the compaction work. An injection during the combustion stroke to generate steam power and to reduce the exhaust gas temperature and thus to reduce the exhaust gas counter pressure is also practiced. The pollutant emission, in particular of nitrogen oxides, of internal combustion engines can be reduced by means of water injection. The water to be injected into the air intake manifold effectuates effective charge air cooling by way of the evaporation heat to be applied and thus also achieves internal cooling of the engine. A performance increase results due to the colder combustion air and thus its higher density.

Only distilled or deionized water is supposed to be used for the water injection to avoid combustion of admixtures and deposits in the injection unit, so that the pollutant emission of the motor vehicle is not increased. Tap water is thus not suitable for water injection.

Therefore, in operating liquid containers for motor vehicles designed as water containers, an electrical conductivity of the water in the water container is a quality property to be monitored. Distilled or deionized water has a significantly reduced conductivity in comparison to tap water, for example.

BRIEF SUMMARY

The present invention is based on the object of providing a method for determining a quality property of an operating liquid in an operating liquid container for a motor vehicle.

More specifically, the disclosure describes a method for determining an electrical conductivity of an operating liquid in an operating liquid container for a motor vehicle, wherein the operating liquid container comprises at least one capacitor fastened on a container wall of the operating liquid container having a first electrode and a second electrode opposite thereto. The method according to the disclosure is characterized by the following method steps A, B, C, and D:

A) applying at least three different AC voltages to the capacitor, wherein a first frequency of a first AC voltage corresponds to a lower limiting frequency, a second frequency of a second AC voltage corresponds to a frequency between the lower limiting frequency and an upper limiting frequency, and a third frequency of a third AC voltage corresponds to the upper limiting frequency;

B) determining and storing a first impedance of the capacitor for the first frequency, a second impedance of the capacitor for the second frequency, and a third impedance of the capacitor for the third frequency;

C) determining a first phase angle from the first impedance, a second phase angle from the second impedance, and a third phase angle from the third impedance; and D) determining (D) that the operating liquid located in the operating liquid container meets a quality requirement if the second phase angle is greater than the first phase angle and is greater than the second phase angle.

The method according to the disclosure has the advantage that a determination of whether an operating liquid located in the operating liquid container corresponds to a predetermined quality requirement is enabled reliably without direct contact of a measuring unit, in the present case the capacitor, with the operating liquid. The predetermined quality requirement correlates with the electrical conductivity of the operating liquid. By determining the electrical conductivity of the operating liquid located in the operating liquid container interior, quality properties of the operating liquid can thus be inferred.

The frequency-dependent impedance of the capacitor is dependent on the electrical conductivity of the medium, which is permeated by the electrical alternating field between the first electrode and the second electrode. The frequency-dependent impedance of the capacitor is thus dependent on the material of the container wall and on the operating liquid located in the operating liquid container interior.

The applicant has discovered that the curve of the impedance of the capacitor over the frequency of the applied AC voltage enables unambiguous inferences of quality properties of the operating liquid. The applicant has thus established that the phase angle of the impedance has a maximum between a lower limiting frequency and an upper limiting frequency when the electrical conductivity of the operating liquid is low. In this case, the lower limiting frequency and the upper limiting frequency of the AC voltage applied to the capacitor are dependent on the geometry of the capacitor and the size of the electrodes of the capacitor and the distance of the electrodes of the capacitor from one another.

The applicant has established that the frequency-dependent phase curve of the impedance of the capacitor for deionized water within the operating liquid container having an electrical conductivity between 1 µS/cm and 50 µS/cm has a maximum in a frequency range between 10 kHz and 1 MHz. The frequency range can change, however, in dependence on the size and the geometry of the capacitor.

The operating liquid container is preferably an operating liquid container for a motor vehicle. Furthermore, the operating liquid container is preferably designed as a water container for a motor vehicle for accommodating water, which is provided for injection into an internal combustion engine of the motor vehicle.

In method step A of applying at least three different AC voltages to the capacitor, preferably a plurality, i.e., more than three different AC voltages each having different frequencies in a frequency range between the lower limiting frequency and the upper limiting frequency are applied to the capacitor.

Both the lower limiting frequency and also the upper limiting frequency are dependent on the geometry and the dimensions of the capacitor and therefore can vary. In particular, the lower limiting frequency is 10 kHz and the upper limiting frequency is 1 MHz. Furthermore, the upper limiting frequency is preferably 100 kHz.

The frequency intervals of the respective AC voltages adjacent to one another are preferably variable and are dependent on the geometry and the dimensions of the capacitor and on the measurement resolution to be achieved. In particular, the frequency interval between the frequencies of the different AC voltages is 1 kHz.

Method step B can also be formulated as follows: determining and storing the frequency-dependent impedances of the capacitor for the different AC voltages.

The phase angle is the angle between the voltage applied to the capacitor and the current flowing through the capacitor.

Therefore, in method step C, a frequency-dependent phase curve is determined between the voltage and the current.

In method step D, the condition that the second phase angle is greater than the first phase angle and is greater than the third phase angle is equivalent to the curve of the phase angle having a maximum between the lower limiting frequency and the upper limiting frequency.

Preferably, the method is designed in such a way that it comprises a method step D1 of outputting a release signal when the second phase angle is greater than the first phase angle and is greater than the third phase angle.

By outputting a release signal, it can be signaled in particular to a control unit of the motor vehicle that the operating liquid located in the operating liquid container interior corresponds to a predetermined quality requirement, so that operation of the motor vehicle is enabled.

The method is preferably designed in such a way that it comprises a method step E of outputting a warning signal if the third phase angle is greater than the second phase angle or is equal to the second phase angle.

In method step E of outputting a warning signal, it is therefore only output if a maximum of the phase angle is not determinable in a frequency-dependent curve of the phase angle between the lower limiting frequency and the upper limiting frequency.

If a maximum of the phase angle is not determinable between the lower limiting frequency and the upper limiting frequency, but a difference between the third phase angle and the first phase angle is greater than a predetermined minimum loss angle, the operating liquid located in the operating liquid container interior then has a quality which is still sufficient. However, a warning signal is output, so that a user of the motor vehicle, in which the operating liquid container is installed, can be notified that the operating liquid located in the operating liquid container interior has a reduced quality, but is still adequate for the operation of the motor vehicle.

A loss angle is to be understood as the difference of −90° and the phase angle of the impedance.

The method is preferably designed such that it comprises a method step F of outputting a stop signal if a difference between the third phase angle and the first phase angle is less than a predetermined minimum loss angle.

If the difference between the third phase angle and the first phase angle is less than a predetermined minimum loss angle, the operating liquid located in the operating liquid container interior then has a quality which is not adequate for the operation of the motor vehicle and could cause damage to the motor vehicle or assemblies of the motor vehicle, for example, a water injection unit for an internal combustion engine. Operation of the motor vehicle can thus be prevented by outputting the stop signal.

More specifically, the underlying object of the present disclosure is achieved by a method for determining an electrical conductivity of an operating liquid in an operating liquid container for a motor vehicle, wherein the operating liquid container comprises at least one capacitor fastened to a container wall of the operating liquid container having a first electrode and a second electrode opposite thereto. The method according to the disclosure is characterized by the following method steps G, H, I, and J:

G) applying at least two different AC voltages to the capacitor, wherein a first frequency of a first AC voltage corresponds to a lower limiting frequency and a second frequency of a second AC voltage corresponds to an upper limiting frequency;

H) determining and storing a first capacitance of the capacitor for the first frequency and a second capacitance of the capacitor for the second frequency;

I) ascertaining a relative deviation of the second capacitance from the first capacitance; and J) determining that the operating liquid located in the operating liquid container meets a predetermined quality requirement if the relative deviation of the second capacitance from the first capacitance is greater than a first minimum deviation.

The method according to the disclosure has the advantage that a determination of whether an operating liquid located in the operating liquid container corresponds to a predetermined quality requirement is enabled reliably without direct contact of a measuring unit, in the present case of the capacitor, with the operating liquid. The predetermined quality requirement correlates with the capacitance of the capacitor, which is in turn dependent on the medium which the electrical alternating field permeates between the first electrode and the second electrode of the capacitor. By determining the frequency-dependent capacitance of the capacitor, quality properties of the operating liquid can thus be inferred.

The frequency-dependent capacitance of the capacitor is dependent on the electrical conductivity of the medium, which is permeated by the electrical alternating field between the first electrode and the second electrode of the capacitor. The frequency-dependent capacitance of the capacitor is thus dependent on the material of the container wall and on the operating liquid located in the operating liquid container interior.

The applicant has discovered that the curve of the capacitance of the capacitor over the frequency of the applied AC voltage enables unambiguous inferences of quality properties of the operating liquid. The applicant has thus established that the curve of the capacitance of the capacitor between a lower limiting frequency and an upper limiting frequency has to have a certain deviation, for example, a certain drop if the electrical conductivity of the operating liquid is low. In this case, the lower limiting frequency and the upper limiting frequency of the AC voltage applied to the capacitor are dependent on the geometry of the capacitor and the size of the electrodes of the capacitor and the distance of the electrodes of the capacitor from one another.

The applicant has established that the capacitance of the capacitor for deionized water having an electrical conductivity between 1 μS/cm and 50 μS/cm within the operating liquid container has to deviate by at least 20% in a frequency range between 10 kHz and 1 MHz. The difference between the capacitance of the capacitor at a frequency of 1 MHz and the capacitance of the capacitor at a frequency of 10 kHz is thus at least 20%. The frequency range can change in dependence on the size and the geometry of the capacitor, however.

The operating liquid container is preferably an operating liquid container for a motor vehicle. Furthermore, the operating liquid container is preferably designed as a water container for a motor vehicle for accommodating water which is provided for injection into an internal combustion engine of the motor vehicle.

In method step I of ascertaining the relative deviation of the second capacitance from the first capacitance, the following calculation is carried out:

$$\text{delta} = |C_{fmin} - C_{fmax}| / C_{fmin}$$

In this case:
fmin is the lower limiting frequency
fmax is the upper limiting frequency
Cfmin is the first capacitance of the capacitor in the case of an AC voltage having the lower limiting frequency fmin
Cfmax is the second capacitance of the capacitor in the case of an AC voltage having the upper limiting frequency fmax
delta is the relative deviation of the second capacitance Cfmax from the first capacitance Cfmin The first minimum deviation is preferably greater than 0.2.

For deionized water and the lower limiting frequency of 10 kHz and an upper limiting frequency of 100 kHz, the minimum deviation is, for example, approximately 0.2 if the electrodes of the capacitor have a length extension of 100 mm, a width extension of 50 mm, and the distance of the first electrode to the second electrode of 10 mm.

The predetermined quality requirement is preferably the conductivity of the operating liquid. If the operating liquid is designed as a water container for accommodating water which is provided for injection into an internal combustion engine, the predetermined quality requirement is, for example, the conductivity of the water and is between 1 μS/cm and 50 μS/cm.

The method is preferably designed in such a way that it comprises a method step J1 of outputting a release signal if the relative deviation of the second capacitance from the first capacitance is greater than the first minimum deviation.

By outputting a release signal, in particular a control unit of the motor vehicle can be signaled that the operating liquid located in the operating liquid container interior corresponds to a predetermined quality requirement, so that operation of the motor vehicle is enabled.

The method is preferably designed in such a way that it comprises a method step K of outputting a warning signal if the relative deviation of the second capacitance from the first capacitance has a value between the first minimum deviation and a second minimum deviation, wherein the second minimum deviation is less than the first minimum deviation.

If the relative deviation of the second capacitance from the first capacitance is less than the first minimum deviation but greater than the second minimum deviation, the operating liquid located in the operating liquid container interior then has a quality which is still adequate. However, a warning signal is output so that a user of the motor vehicle in which the operating liquid container is installed can be notified that the quality of the operating liquid located in the operating liquid container interior has a reduced quality, which is still sufficient for the operation of the motor vehicle, however.

The method is preferably designed in such a way that it has a method step K of outputting a stop signal if the relative deviation of the second capacitance from the first capacitance is less than a second minimum deviation, wherein the second minimum deviation is less than the first minimum deviation.

In this case, the operating liquid located in the operating liquid container interior has a quality which is not adequate for the operation of the motor vehicle and could cause damage to the motor vehicle or assemblies of the motor vehicle, for example, a water injection unit or an internal combustion engine.

Operation of the motor vehicle can thus be prevented by outputting the stop signal.

Of course, it is also possible to combine features of the methods disclosed.

Furthermore, the present invention is based on the object of providing an operating liquid container which is designed for determining a quality property of an operating liquid located therein.

This object is achieved by an operating liquid container having the features as disclosed. Advantageous designs of the operating liquid container are described herein.

More specifically, the underlying object of the present disclosure is achieved by an operating liquid container, the operating liquid container interior of which is delimited by a ceiling wall, a bottom wall, and a side wall connecting the bottom wall to the ceiling wall. The operating liquid container comprises at least one capacitor fastened on a container wall of the operating liquid container having a first electrode and a second electrode. Furthermore, the operating liquid container has an electronic evaluation unit which is electrically connected to the first electrode and to the second electrode.

The operating liquid container according to the disclosure is characterized in that the evaluation unit is designed to execute at least one of the above-described methods.

The at least one capacitor is preferably attached on or in a side wall of the operating liquid container. Furthermore, the at least one capacitor is preferably arranged on the side wall or in the side wall in such a way that the first electrode and the second electrode, which each have a length extension, a width extension, and a depth extension, each extend in parallel to the side wall in such a way that the length extensions of the first electrode and the second electrode extend from the bottom wall in the direction of the ceiling wall.

According to a further design of the operating liquid container, the at least one capacitor is arranged on the bottom wall or in the bottom wall, so that the first electrode and the second electrode each extend in parallel to the bottom wall.

The at least one capacitor can be arranged on an outer side of the container wall and can be connected thereto. Furthermore, it is also possible that the at least one capacitor is integrated or embedded in the container wall. In this case, the respective first and second electrodes of the capacitor are enclosed by the container wall.

The operating liquid container is preferably designed in such a way that the at least one capacitor is embedded in the container wall.

If the electrodes of the capacitor are embedded in the container wall, the electrodes are enclosed by the container wall, so that only electrical terminals of the electrodes still protrude out of the container wall.

The correspondingly designed operating liquid container has the advantage that due to the embedding of the at least one capacitor in the container wall of the operating liquid container, the first electrode and the second electrode of the at least one capacitor have a reduced distance to the operating liquid container interior and thus to the operating liquid located in the operating liquid container interior. An electrical field located between the first electrode and the second electrode thus interacts less with the material of the container wall and more with the operating liquid located in the operating liquid container interior. The electrical conductivity of the operating liquid in the operating liquid container interior may thus be determined with increased accuracy.

A further advantage of embedding the at least one capacitor in the container wall is that the at least one capacitor is both mechanically and chemically protected, so that the operating liquid container according to the disclosure has enhanced long-term stability.

The operating liquid container is designed in particular as an operating liquid container for a motor vehicle.

The operating liquid container is preferably designed in such a way that the bottom wall comprises a protrusion extending into the operating liquid container interior, wherein the first electrode and the second electrode of the capacitor are embedded in the protrusion.

By way of a corresponding design of the operating liquid container, the determination of the electrical conductivity of the operating liquid is enabled with still further increased accuracy, since possible deposits in the region of the bottom wall have a reduced influence on the determination of the electrical conductivity of the operating liquid located in the operating liquid container interior.

The protrusion of the bottom wall is preferably formed as a fold into the operating liquid container interior.

The protrusion is preferably elevated between 2 mm and 5 mm from the surrounding inner surface of the bottom wall.

The operating liquid container is preferably designed in such a way that the container wall comprises an outer layer, an inner layer facing toward the operating liquid container interior, and an adhesive layer arranged between them, wherein the first electrode and the second electrode of the at least one capacitor are arranged between the outer layer and the adhesive layer.

The at least one capacitor is therefore arranged between the outer layer and the adhesive layer. The inner layer can therefore be brought into direct contact with the operating liquid.

A corresponding design of the operating liquid container enables a simplified structure and a simplified integration of the capacitor in the container wall of the operating liquid container.

The operating liquid container is preferably designed in such a way that the container wall comprises a shielding layer and an insulation layer, wherein the shielding layer is arranged between the outer layer and the first and second electrodes, and wherein the insulation layer is arranged between the shielding layer and the first and second electrodes.

The correspondingly designed operating liquid container has the advantage that it has still further increased accuracy with respect to the determination of the electrical conductivity of the operating liquid located in the operating liquid container interior. This is because the shielding layer, which is preferably formed as a metal layer, shields the electrodes of the at least one capacitor from interfering fields.

The shielding layer is therefore arranged between the outer layer and the reference capacitor or the capacitor.

The shielding layer is preferably in contact with the outer layer.

The insulation layer is therefore arranged in a sandwich between the shielding layer and the capacitor.

The shielding layer comprises a metal, so that the at least one capacitor is protected from electrical interference fields.

The insulation layer is manufactured from a dielectric material, preferably a plastic, so that the first and second electrodes of the at least one capacitor are not in electrical contact with the shielding layer.

The operating liquid container is preferably formed in such a way that the insulation layer has the same dialectical conductivity as the inner layer and/or the outer layer.

The correspondingly formed operating liquid container has the advantage that it has further increased accuracy with respect to the determination of the electrical conductivity of the operating liquid located in the operating liquid container interior.

The operating liquid container is preferably formed in such a way that a distance of the first and second electrodes to the operating liquid container interior is between 1.5 mm and 3.5 mm.

The correspondingly designed operating liquid container has the advantage that it has a further increased accuracy with respect to the determination of the electrical conductivity of the operating liquid located in the operating liquid container interior, because the distance of the corresponding electrodes to the operating liquid located in the operating liquid container interior is reduced.

The inner layer therefore preferably has a thickness of 1.5 mm 15 to 3.5 mm.

The at least one capacitor therefore has a distance of only 1.5 mm to 3.5 mm to the operating liquid container interior.

The operating liquid container is preferably formed in such a way that at least one of the first and second electrodes of the capacitor has a nonuniform width extension along its length extension.

The wider the electrodes are, the deeper the electrical field penetrates into the operating liquid container interior and into the operating liquid located therein, so that the operating liquid has a greater influence on the determination of the electrical conductivity of the operating liquid.

The operating liquid container is preferably designed in such a way that at least one of the first and second electrodes of the capacitor has an enlarged width extension in the direction of the bottom wall along its longitudinal extension.

The correspondingly designed operating liquid container has the advantage that the measurement accuracy of the electrical conductivity by means of the capacitor in the bottom region of the operating liquid container is increased.

BRIEF DESCRIPTION OF THE DRAWINGS

Further advantages, details, and features of the invention result hereinafter from the explained exemplary embodiments. In the specific figures:

FIG. 6: shows a greatly simplified illustration of a layer structure of the bottom wall and/or the side wall of the operating liquid container according to a further embodiment of the present disclosure; and FIGS. 7A to 7C: show examples of measurement capacitors alone in a lateral top view of operating liquid containers of different embodiments of the present disclosure.

DETAILED DESCRIPTION

In the following description, identical reference signs identify identical components or identical features, so that a description with respect to a component carried out with reference to one figure also applies to the other figures, so that a repeated description is avoided. Furthermore, individual features which were described in conjunction with one embodiment are also usable separately in other embodiments.

Figure 1:
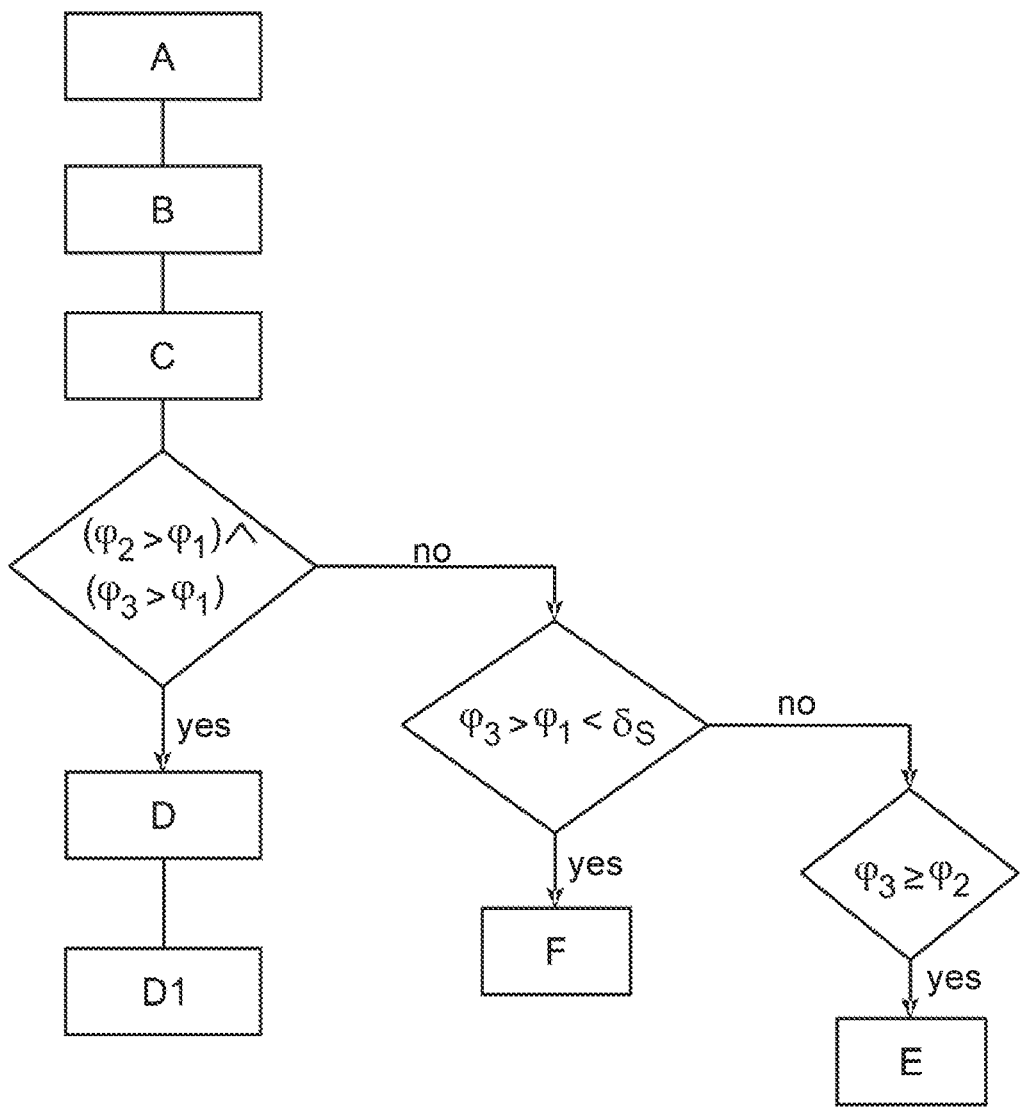
FIG. 1: shows a flow chart diagram of a method for determining a quality property of an operating liquid according to a first embodiment of the present disclosure, wherein the quality property is an electrical conductivity of the operating liquid.

FIG. 1 shows a flow chart diagram of a method for determining a quality property of an operating liquid according to a first embodiment of the present disclosure, wherein the quality property is an electrical conductivity of the operating liquid. The method according to the flow chart diagram illustrated in FIG. 1 is executed by an operating liquid container 1 illustrated in FIG. 5.

Figure 5:
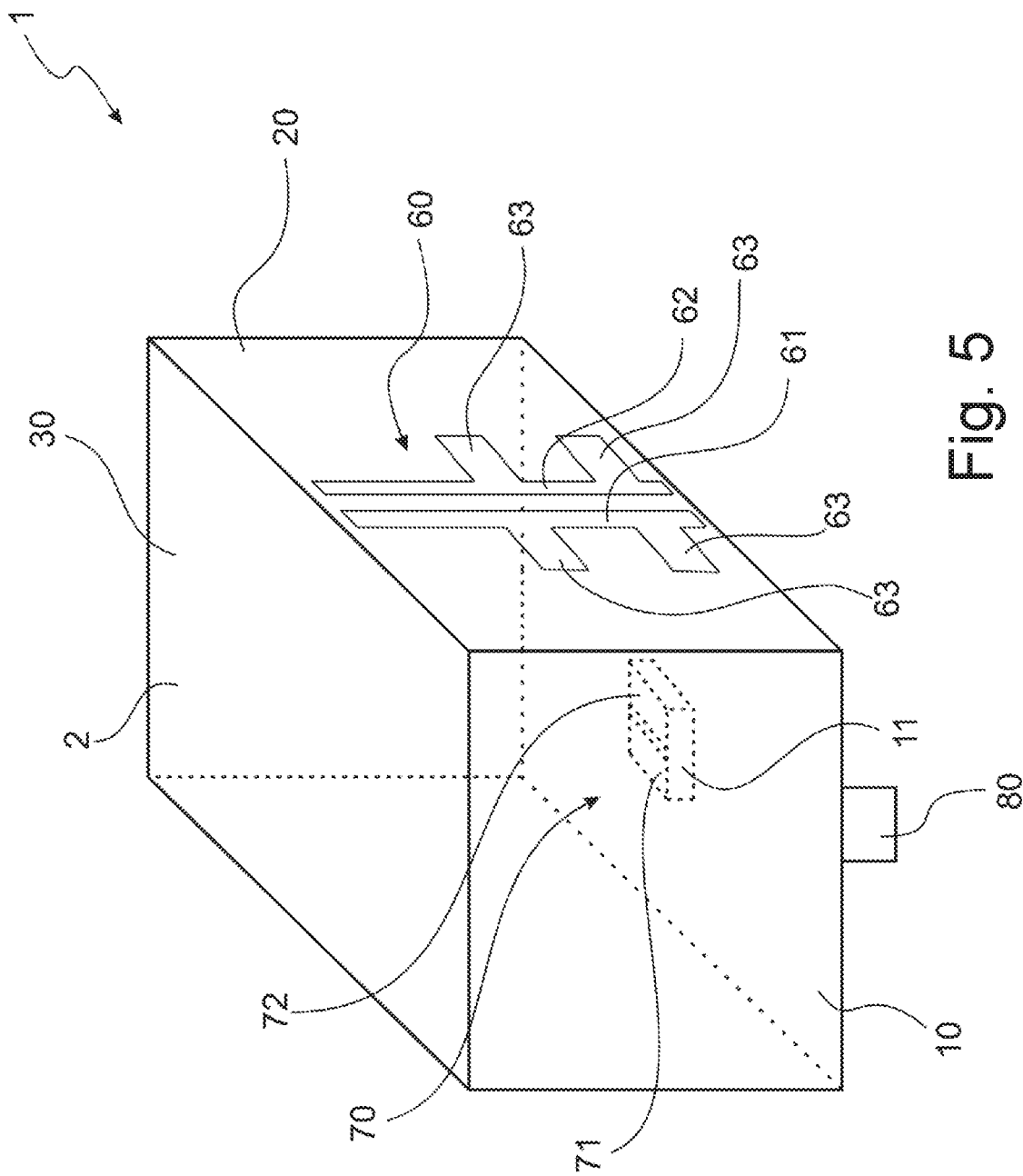
FIG. 5: shows a greatly simplified three-dimensional illustration of an operating liquid container according to the disclosure.

FIG. 5 shows a greatly simplified three-dimensional illustration of an operating liquid container 1 according to the disclosure. An operating liquid container interior 2 is delimited by a ceiling wall 30, a bottom wall 10, and a side wall 20, which connects the bottom wall 10 to the ceiling wall 30. It is apparent from FIG. 5 that the side wall 20 is formed circumferentially.

The operating liquid container 1 illustrated in FIG. 5 comprises a first capacitor 60 and a second capacitor 70. However, according to the present disclosure, the operating liquid container 1 can also comprise only the first capacitor 60 or only the second capacitor 70. Furthermore, the operating liquid container 1 can also comprise further capacitors, which are not shown in FIG. 5.

The first capacitor 60 comprises a first electrode 61 and a second electrode 62. Both the first electrode 61 and also the second electrode 62 each have a length extension L, a width extension B, and a depth extension (see FIGS. 7A to 7C). The first electrode 61 and the second electrode 62 are each arranged extending in parallel to the side wall 20 in this case such that the length extensions L of the first electrode 61 and the second electrode 62 extend from the bottom wall 10 in the direction of the ceiling wall 30. In this case, depth extensions of the first electrode 61 and the second electrode 62 are arranged opposite to one another.

Figure 4:
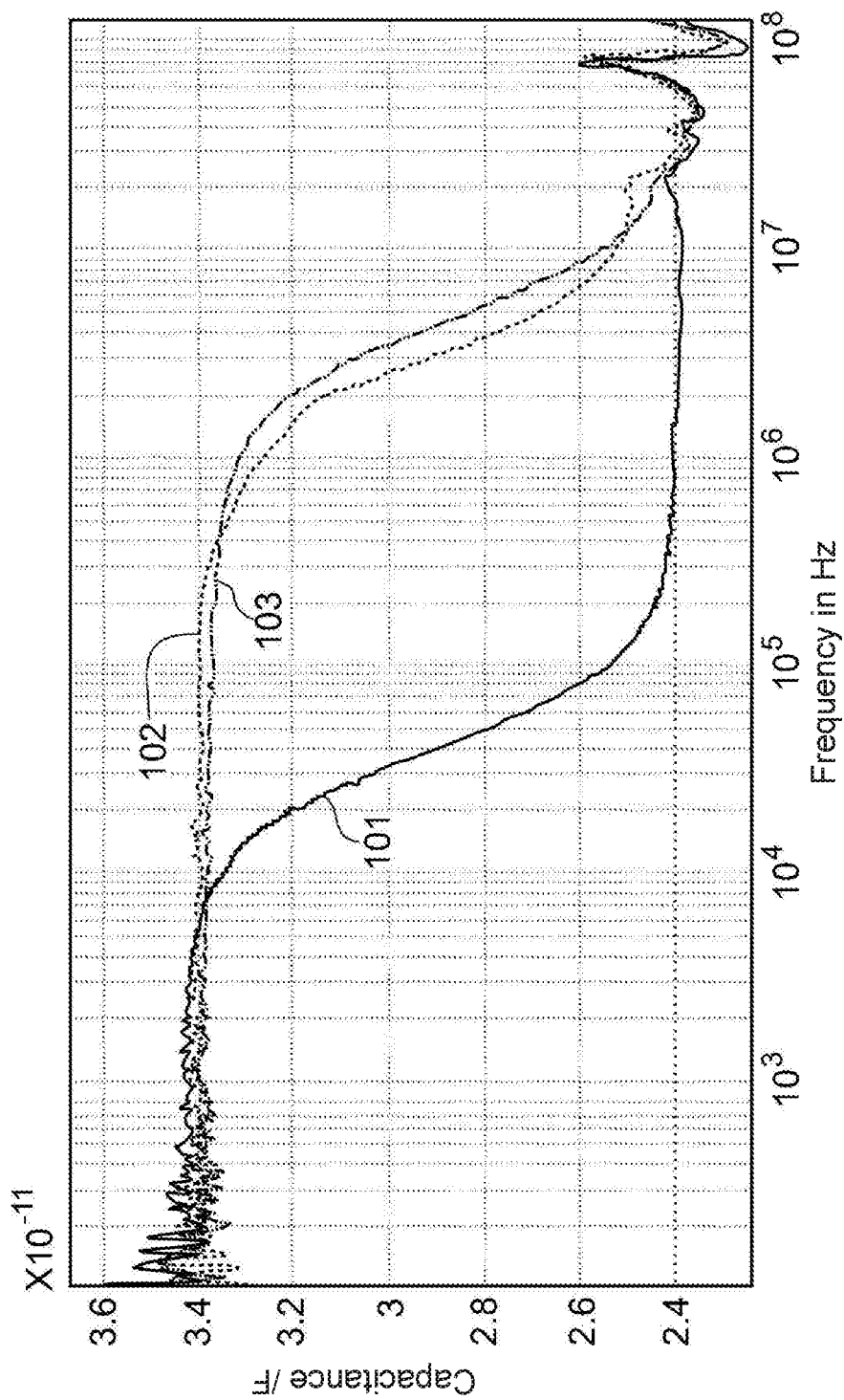
FIG. 4: shows frequency-dependent capacitance curves of a capacitor for three different operating liquids, which each have different electrical conductivities.

The first capacitor 60 is embedded in the side wall 20, so that the first electrode 61 and the second electrode 62 of the first capacitor 60 are embedded in the side wall 20. The first capacitor 60 is therefore enclosed by the side wall 20. The first electrode 61 and the second electrode 62 of the first capacitor 60 are therefore not in direct contact with an operating liquid 50 (see FIG. 6). Furthermore, the first electrode 61 and the second electrode 62 of the first capacitor 60 are also not in direct contact with the surroundings of the operating liquid container 1. Reference is made to FIG. 4, which is described hereinafter, with respect to the embedding of the first capacitor 60 in the side wall 20.

However, the present disclosure is not restricted to the first capacitor 60 being embedded in the side wall 20. In the operating liquid container 1 according to the disclosure, the first capacitor 60 can also be arranged on an outer surface of the side wall 20.

Is apparent from FIG. 5 that the first electrode 61 and the second electrode 62 of the first capacitor 60 each comprise two wings 63, which extend in parallel to the width extension B of the electrodes 61, 62. The respective wings 63 are formed in this case at different heights of the first and second electrodes 61, 62, so that the wings 63 are arranged at different heights of the operating liquid container 1. The first and second electrodes 61, 62 of the first capacitor 60 therefore have a nonuniform width extension B along the length extension L thereof. However, the present disclosure is not restricted to a corresponding design of the first and second electrodes 61, 62 of the first capacitor 60. For example, the first and second electrodes 61, 62 of the first capacitor 60 can also comprise a uniform width extension B over the length extensions L thereof.

The second capacitor 70 comprises a first electrode 71 and a second electrode 72. The first electrode 71 and the second electrode 72 extend in parallel to the bottom wall 10. The first electrode 71 and the second electrode 72 are each arranged extending in parallel to the bottom wall 10 here in such a way that the length extensions and the width extensions of the first electrode 71 and the second electrode 72 extend in the plane of the bottom wall 10, so that the depth extensions of the first electrode 71 and the second electrode 72 are arranged opposite to one another.

As is apparent from FIG. 5, the bottom wall 10 comprises a protrusion 11 extending into the operating liquid container interior 2. The second capacitor 70 is embedded in the bottom wall 10 in such a way that the first electrode 71 and the second electrode 72 of the second capacitor 70 are embedded in the protrusion 11 of the bottom wall 10. The first electrode 71 and the second electrode 72 of the second capacitor 70 are therefore not in direct contact with the operating liquid 50. Furthermore, the first electrode 71 and the second electrode 72 of the second capacitor 70 are also not in direct contact with the surroundings of the operating liquid container 1. Due to the embedding of the first electrode 71 and the second electrode 72 in the protrusion 11 of the bottom wall 10, possible deposits on the bottom wall 10 have a reduced effect on the determination of the electrical conductivity of the operating liquid 50 located in the operating liquid container interior 2.

Reference is made to FIG. 6, which is described hereinafter, with respect to the embedding of the second capacitor 70 in the bottom wall 10 or in the protrusion 11 of the bottom wall 10.

However, the present disclosure is not restricted to the second capacitor 70 being embedded in the bottom wall 10. In an operating liquid container 1 according to the disclosure, the second capacitor 70 can also be fastened on an outer surface of the bottom wall 10.

The operating liquid container 1 furthermore comprises an electronic evaluation unit 80, which is electrically connected to the first capacitor 60 and the second capacitor 70. The electrical connection of the evaluation unit 80 to the first capacitor 60 and the second capacitor 70 is produced via electrical lines (not shown in FIG. 5).

The evaluation unit 80 is designed to execute the method according to the flow chart diagram illustrated in FIG. 1, which is described hereinafter.

In a method step A, at least three different AC voltages having different frequencies are applied to the first capacitor 60 and/or to the second capacitor 70. In this case, a first frequency of a first AC voltage corresponds to a lower limiting frequency fmin, for example, 10 kHz. A second frequency of a second AC voltage corresponds to a frequency between the lower limiting frequency fmin and an upper limiting frequency fmax, wherein the upper limiting frequency is, for example, 100 kHz. A third frequency of a third AC voltage corresponds to the upper limiting frequency fmax.

In a method step B, a first impedance of the first capacitor 60 and/or of the second capacitor 70 for the first frequency, a second impedance of the first capacitor 60 and/or the second capacitor 70 for the second frequency, and a third impedance of the first capacitor 60 and/or the second capacitor 70 for the third frequency are determined and each stored.

Subsequently, in a method step C, a first phase angle $\varphi 1$ is determined from the first impedance, a second phase angle $\varphi 2$ is determined from the second impedance, and a third phase angle $\varphi 3$ is determined from the third impedance.

Figure 2:
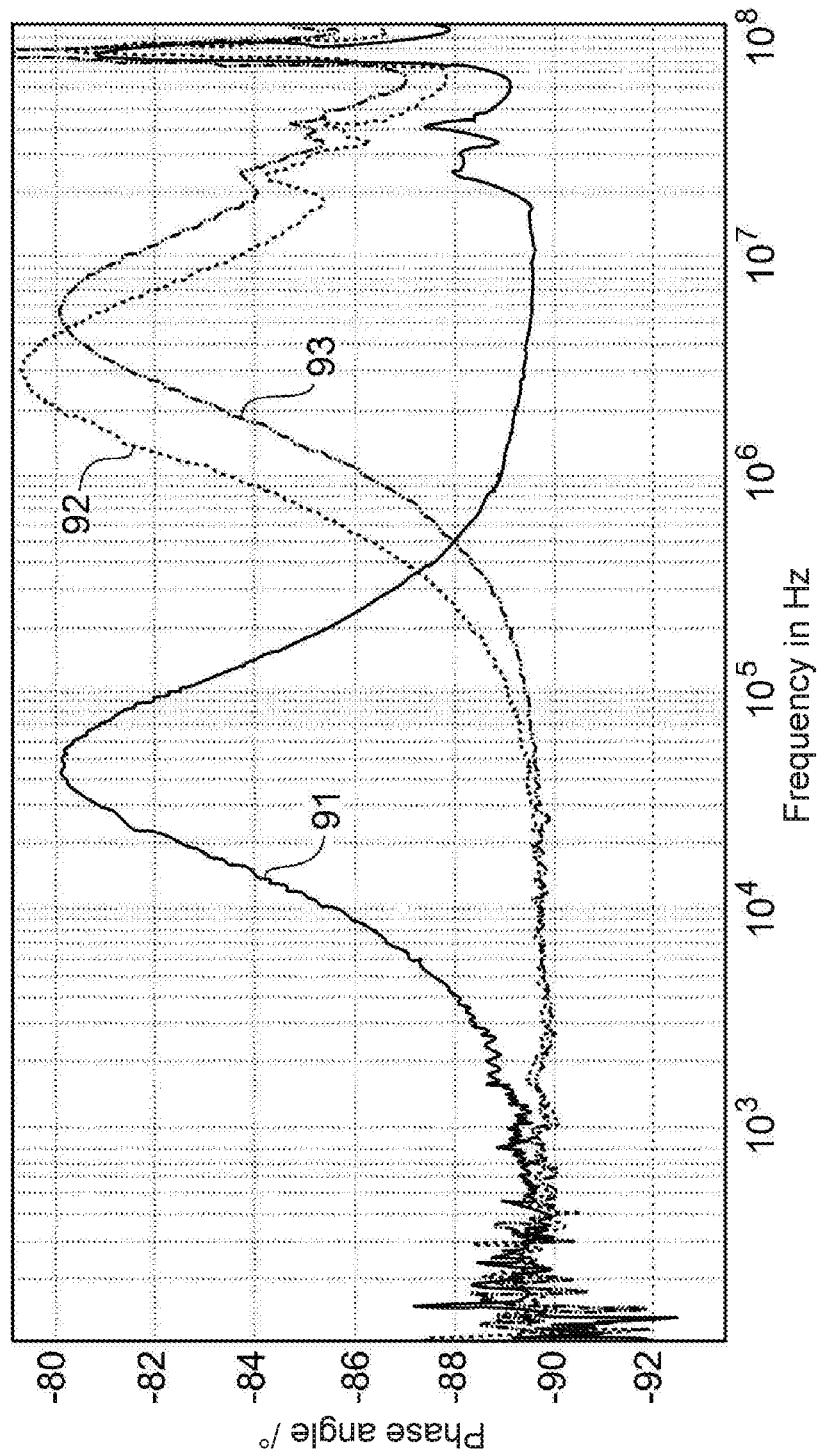
FIG. 2: shows frequency-dependent phase curves of the impedance of a capacitor for three different operating liquids, which each have different electrical conductivities.

Three different frequency-dependent phase curves of impedances of the first capacitor 60 and/or the second capacitor 70 are illustrated for three different operating liquids in FIG. 2.

In this case, the curve 91 shows a phase curve of the impedance for deionized water. The curve 92 shows the frequency-dependent curve of the phase angle of the impedance for a mixture of 50% deionized water and 50% tap water, and the curve 93 shows the frequency-dependent curve of the phase angle of the impedance for tap water. The deionized water has an electrical conductivity between 1-50 µS/cm. The mixture of 50% deionized water and 50% tap water has an electrical conductivity between 50-200 µS/cm. The tap water has an electrical conductivity of greater than 200 µS/cm.

It is apparent from FIG. 2 that the curve 91 of the phase angle of the impedance of the capacitor 60, 70 in the case of deionized water has a maximum between a lower limiting frequency fmin of 10 kHz and an upper limiting frequency fmax of 100 kHz. In contrast, it is furthermore apparent from FIG. 2 that the curve 92 of the phase angle of the impedance of the capacitor 60, 70 for the mixture of deionized water and tap water rises continuously between the lower limiting frequency fmin and the upper limiting frequency fmax. This is also true for the curve 93 of the phase angle of the impedance of the capacitor 60, 70 for tap water. It is apparent in this case that at the upper limiting frequency fmax of 100 kHz, the curve 93 rises more slowly than the curve 92.

Returning to the method according to the flow chart diagram illustrated in FIG. 1, it is checked after method step C whether the second phase angle $\varphi 2$ is greater than the first phase angle $\varphi 1$ and is also greater than the third phase angle $\varphi 3$. If this condition is met, the curve of the phase angle then has a maximum between the lower limiting frequency fmin and the upper limiting frequency fmax. If the curve of the phase angle has a maximum, it is then determined or established in a method step D that the operating liquid located in the operating liquid container 1 meets a predetermined quality requirement.

In the described exemplary embodiment, it is determined upon ascertainment of a maximum of the curve of the phase angle that the electrical conductivity of the operating liquid located in the operating liquid container interior 2 has an electrical conductivity between 1-50 µS/cm. it can be inferred therefrom that the water located in the operating liquid container interior 2 is deionized water and is suitable for the operation of a water injection unit. In this case, a release signal is output in a method step D1. However, step D1 is optional and not obligatory.

If it is ascertained that the second phase angle $\varphi 2$ is not greater than the third phase angle $\varphi 3$, it is checked whether a difference between the third phase angle $\varphi 3$ and the first phase angle $\varphi 1$ is less than a predetermined minimum loss angle $\delta s$. The minimum loss angle $\delta s$ in the illustrated exemplary embodiment is 1°. It is apparent from the frequency-dependent curve 93 illustrated in FIG. 2 that the loss angle for the upper limiting frequency fmax is less than 1° and is thus less than the minimum loss angle $\delta s$. A stop signal is thus output in a method step F. By means of the stop signal, a water injection system (not shown in the figures) can thus be signaled that the water located in the operating liquid container interior 2 is not suitable for the water injection, since the water has an electrical conductivity of greater than 200 µS/cm. The water located in the operating liquid container interior 2 is thus, for example, tap water.

If the difference between the third phase angle $\varphi 3$ and the first phase angle $\varphi 1$ is not less than the predetermined minimum loss angle $\delta s$, it is checked whether the third phase angle $\varphi 3$ is greater than the second phase angle $\varphi 2$. If this condition is met, it is then concluded that the water located in the operating liquid container interior 2 has an electrical conductivity between 50-200 µS/cm. The quality properties of this water are still sufficient for the water injection. However, a warning signal is output in a method step E, so that the user of the motor vehicle in which the operating liquid container 1 according to the disclosure is installed can be made aware that the water located in the operating liquid container interior 2 does meet the requirements but comprises contaminants.

Figure 3:
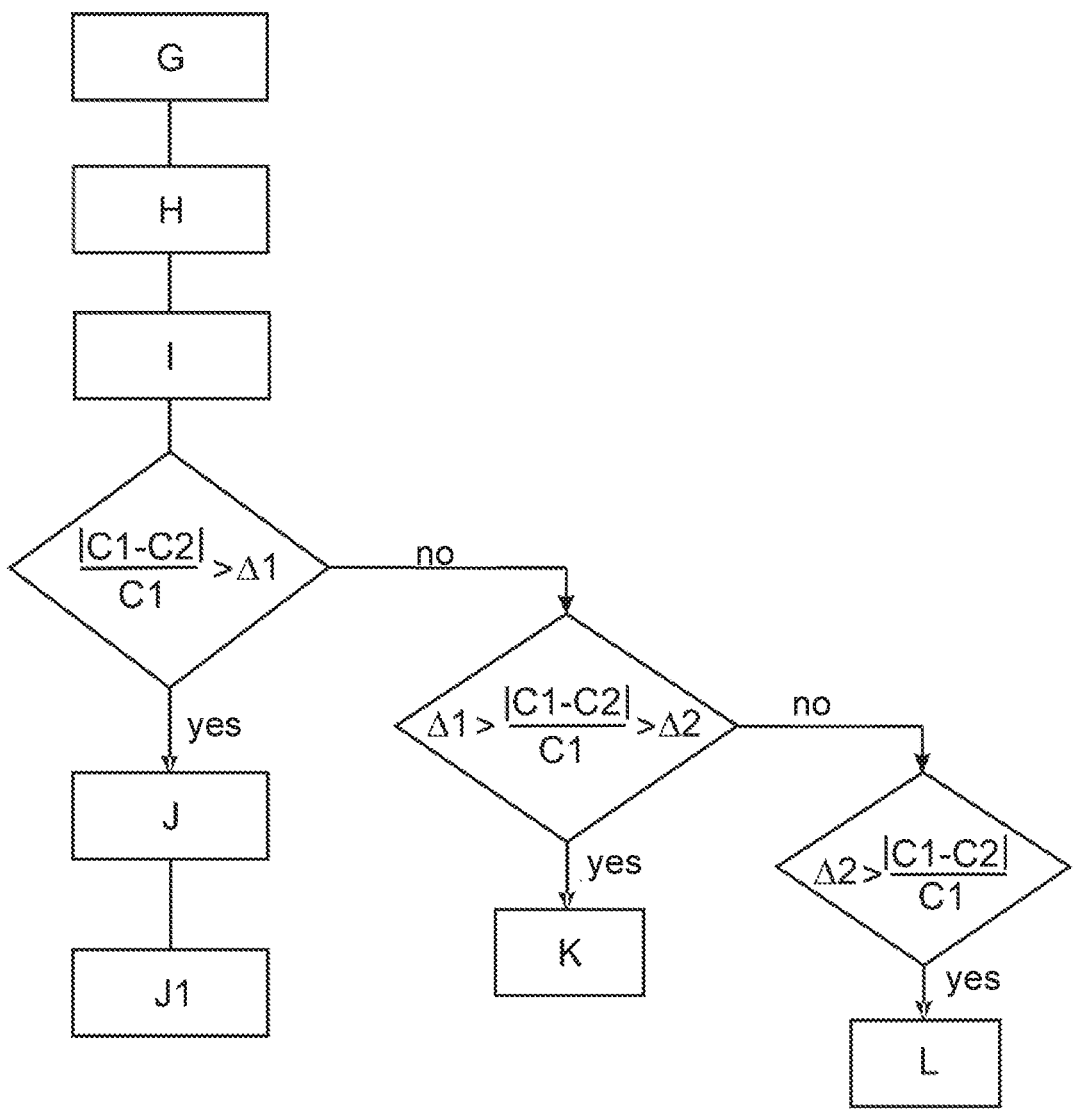
FIG. 3: shows a flow chart diagram of a method for determining a quality property of an operating liquid according to a second embodiment of the present disclosure, wherein the quality property is an electrical conductivity of the operating liquid.

The evaluation unit 80 of the operating liquid container 1 illustrated in FIG. 5 is furthermore designed to execute the method according to the flow chart diagram illustrated in FIG. 3, which is described hereafter.

In a method step G, at least two different AC voltages having different frequencies are applied to the first capacitor 60 and/or to the second capacitor 70. In this case, a first frequency of a first AC voltage corresponds to a lower limiting frequency fmin. A second frequency of a second AC voltage corresponds to an upper limiting frequency fmax.

Subsequently, in a method step H, a first capacitance C1 of the first capacitor and/or the second capacitor 70 for the first frequency is determined and stored. Furthermore, in method step H, a second capacitance C2 of the first capacitor 60 and/or of the second capacitor 70 for the second frequency is determined and stored.

Subsequently, in a method step I, a relative deviation of the second capacitance C2 from the first capacitance C1 is ascertained. It is therefore ascertained in method step I by how many percent the second capacitance C2 deviates from the first capacitance C1.

Three different frequency-dependent capacitance curves of the first capacitor 60 and/or the second capacitor 70 for three different operating liquids are illustrated in FIG. 4. In this case, the curve 101 shows a frequency-dependent capacitance curve of the first capacitor 60 and/or the second capacitor 70 for deionized water. The curve 102 shows the frequency-dependent capacitance curve of the first capacitor 60 and/or the second capacitor 70 for a mixture of 50% deionized water and 50% tap water, and the curve 103 shows the frequency-dependent capacitance curve of the first capacitor 60 and/or the second capacitor 70 for tap water. The deionized water has an electrical conductivity between 1-50 μS/cm. The mixture of 50% deionized water and 50% tap water has an electrical conductivity between 50-200 μS/cm. The tap water has an electrical conductivity of greater than 200 μS/cm.

It is apparent from FIG. 4 that the curve 101 of the frequency-dependent capacitance of the capacitor 60, 70 in the case of deionized water as the operating liquid drops from the first capacitance C1 to the second capacitance C2. In this case, the capacitor 60, 70 has the first capacitance C1 of approximately 3.2 pF at the lower limiting frequency fmin, which is 10 kHz in the illustrated exemplary embodiments, and has the second capacitance C2 of approximately 2.4 pF at the upper limiting frequency fmax, which is 1 MHz in the illustrated exemplary embodiment. Therefore, the relative deviation from C1 to C2 in the case of deionized water as the operating liquid is approximately 25%.

It is furthermore apparent from FIG. 4 that the frequency-dependent capacitance of the capacitor 60, 70 in the case of the mixture of 50% deionized water and 50% tap water as the operating liquid drops from the first capacitance C1 to the second capacitance C2. In this case, the capacitor 60, 70 has the first capacitance C1 of approximately 3.6 pF at the lower limiting frequency fmin, which is 10 kHz in the illustrated exemplary embodiment, and has the second capacitance C2 of approximately 3.4 pF at the upper limiting frequency fmax, which is 1 MHz in the illustrated exemplary embodiment. The relative deviation from C1 to C2 in the case of the mixture of 50% deionized water and 50% tap water as the operating liquid is therefore approximately 6%.

It is furthermore apparent that the frequency-dependent capacitance of the capacitor 60, 70 drops from the first capacitance C1 to the second capacitance C2 in the case of tap water as the operating liquid. In this case, the capacitor 60, 70 has the first capacitance C1 of approximately 3.4 pF at the lower limiting frequency fmin, which is 10 kHz in the illustrated exemplary embodiment, and has the second capacitance C2 of approximately 3.35 pF at the upper limiting frequency fmax, which is 1 MHz in the illustrated exemplary embodiment. The relative deviation from C1 to C2 in the case of tap water as the operating liquid is therefore approximately 1.5%.

Returning to the method according to the flow chart diagram illustrated in FIG. 3, it is checked after method step I whether the relative deviation of the second capacitance C2 from the first capacitance C1 is greater than a first minimum deviation $\Delta 1$. More specifically, it is determined whether the following condition is met:

$$\frac{|C1 - C2|}{C1} > \Delta 1$$

If this condition is met, it is determined in a method step J that the operating liquid located in the operating liquid container 1 meets a predetermined quality requirement, since the electrical conductivity of the operating liquid has a value between 1 to 50 μS/cm.

In the described exemplary embodiment, the minimum deviation $\Delta 1$ has a value of 0.2. It is thus determined for deionized water as the operating liquid in method step J that the deionized water meets the predetermined quality requirement, since the relative deviation of the second capacitance C2 from the first capacitance C1 is 25% and thus 0.25.

Subsequently, in a method step J1, a release signal is output if the relative deviation of the second capacitance C2 from the first capacitance C1 is greater than the first minimum deviation $\Delta 1$. However, method step J1 is solely optional for the present invention and is not obligatory.

In contrast, if the condition $$\frac{|C1 - C2|}{C1} > \Delta 1$$

is not met, it is checked whether the following condition is met:

$$\Delta 1 > \frac{|C1 - C2|}{C1} > \Delta 2$$

If this condition is met, it is concluded that the water located in the operating liquid container interior 2 has an electrical conductivity between 50-200 μS/cm. The quality properties of this water are still sufficient for the water injection. However, a warning signal is output in a method step K, so that the user of the motor vehicle in which the operating liquid container 1 according to the invention is installed can be made aware that the water located in the operating liquid container interior 2 does meet the requirements but comprises contaminants. Therefore, in method step K, a warning signal is output if the relative deviation of the second capacitance C2 from the first capacitance C1 has a value between the first minimum deviation $\Delta 1$ and a second minimum deviation $\Delta 2$, wherein the second minimum deviation $\Delta 2$ is less than the first minimum deviation $\Delta 1$.

In the described exemplary embodiment, $\Delta 2$ has a value of 0.05. Therefore, for a mixture made up of 50% deionized water and 50% tap water as the operating liquid, in the case of which |C1−C2|/C1 results in a value of 0.06, the condition 0.2>0.06>0.05 is met, so that a warning signal is output in method step K.

In contrast, if the condition $$\Delta 1 > \frac{|C1 - C2|}{C1} > \Delta 2$$

is not met, it is checked whether the following condition is met:

$$\Delta 2 > \frac{|C1 - C2|}{C1}$$

If this condition is met, it is concluded that the water located in the operating liquid container interior 2 has an electrical conductivity of greater than 200 µS/cm. The quality properties of this water are inadequate for the water injection. Therefore, a stop signal is output in a method step L. By means of the stop signal, a water injection system (not shown in the figures) can be signaled that the water located in the operating liquid container interior 2 is not suitable for the water injection, since the water has an electrical conductivity of greater than 200 µS/cm. The water located in the operating liquid container interior 2 is therefore, for example, tap water.

Therefore, a stop signal is output in method step L if the relative deviation of the second capacitance C2 from the first capacitance C1 is less than the second minimum deviation Δ2.

In the described exemplary embodiment, Δ2 has a value of 0.05. Therefore, for tap water as an operating liquid, in the case of which |C1−C2|/C1 results in a value of 0.015, the condition 0.05>0.015 is met, so that a stop signal is output in method step L.

FIG. 6 shows a greatly simplified illustration of a layer structure of a container wall 10, 20, 30 of the operating liquid container 1. The container wall can be the bottom wall 10 and/or the side wall 20 and/or the ceiling wall 30. It is apparent that the container wall 10 is constructed in multiple layers.

The layer structure of the container wall 10, 20, 30 is described hereinafter with reference to the side wall 20 and with reference to the first capacitor 60. However, the bottom wall 10 and/or the ceiling wall 30 can also have a corresponding layer structure. Furthermore, the second capacitor 70 can also be embedded in the same manner in the container wall 10, 20, 30.

It is apparent that the side wall 20 comprises an outer layer 41, an inner layer 45 facing toward the operating liquid container interior 2, and an adhesive layer 44 arranged between the outer layer 41 and the inner layer 45. The first electrode 61 and the second electrode 62 of the first capacitor 60 are arranged between the outer layer 41 and the adhesive layer 44. The side wall 20 furthermore comprises a shielding layer 42 and an insulation layer 43, wherein the shielding layer 42 is arranged between the outer layer 41 and the first electrode 61 and the second electrode 62 of the first capacitor 60. The insulation layer 43 is in turn arranged between the shielding layer 42 and the first and second electrodes 61, 62 of the first capacitor 60.

It is furthermore apparent that the side wall 20 comprises an outer layer 41, an inner layer 45 facing toward the operating liquid container interior 2, and an adhesive layer 44 arranged between the outer layer 41 and the inner layer 45. The first electrode 61 and the second electrode 62 of the first capacitor 60 are arranged between the outer layer 41 and the adhesive layer 44. The side wall 20 furthermore comprises a shielding layer 42 and an insulation layer 43, wherein the shielding layer 42 is arranged between the outer layer 41 and the first and second electrodes 61, 62 of the first capacitor 60. The insulation layer 43 is in turn arranged between the shielding layer 42 and the first and second electrodes 61, 62 of the first capacitor 60.

FIG. 7A shows a first capacitor 60 alone in a lateral top view. In the illustrated exemplary embodiment, it is apparent that the first electrode 61 of the first capacitor 60 has a uniform width extension B along its length extension L. The second electrode 62 of the first capacitor 60, in contrast, has a changed width extension B along the length extension of the second electrode 62. It is apparent that the width of the second electrode 62 along its length extension L has a width extension B increasing in the direction of the bottom wall 10.

FIG. 7B shows a further example of a first capacitor 60 according to a further embodiment of the operating liquid container 1. It is apparent that both the first electrode 61 and also the second electrode 62 each comprise two wings 63 at different heights, i.e., in different positions with respect to the length extension L of the first and second electrodes 61, 62, which wings extend along the width extension B of the first and second electrodes 61, 62. It is apparent that the respective wings 63 are rounded.

FIG. 7C in turn shows a first capacitor 60 of an operating liquid container 1 according to a further embodiment. The first capacitor 60 shown in FIG. 7C is also designed such that both the first electrode 61 and also the second electrode 62 each comprise two wings 63, which extend in the width extension B of the respective electrodes 61, 62. The respective wings 63 are arranged here at different heights of the respective electrodes 61, 62.

The present disclosure is not restricted to the designs of the first capacitor 60 illustrated in FIGS. 7A to 7C, however, as long as an electrical field is generated by means of the first capacitor 60 which extends into the operating liquid container interior 2, so that the electrical conductivity of the operating liquid 50 can be ascertained by means of the evaluation unit 80.

LIST OF REFERENCE SIGNS 1 operating liquid container
2 operating liquid container interior
10 bottom wall (of the operating liquid container)
11 protrusion (of the bottom wall)
20 side wall of the operating liquid container)
30 ceiling wall
41 outer layer (of the bottom wall/the side wall)
42 shielding layer (of the bottom wall/the side wall)
43 insulation layer (of the bottom wall/the side wall)
44 adhesive layer (of the bottom wall/the side wall)
45 inner layer (of the bottom wall/the side wall)
50 operating liquid
60 first capacitor
61 first electrode (of the first capacitor)
62 second electrode (of the first capacitor)
63 wings (of the first electrode and/or the second electrode)
70 second capacitor
71 first electrode (of the second capacitor)
72 second electrode (of the second capacitor)
80 evaluation unit
91 frequency-dependent phase curve for deionized water
92 frequency-dependent phase curve for a mixture of 50% deionized water and 50% top water 93 frequency-dependent phase curve for tap water
101 frequency-dependent capacitance curve for deionized water
102 frequency-dependent capacitance curve for a mixture of 50% deionized water and 50% tap water
103 frequency-dependent capacitance curve for tap water
L length extension (of the electrodes of the measurement capacitor)
B width extension (of the electrodes of the measurement capacitor)
C1 first capacitance (of the capacitor)
C2 second capacitance (of the capacitor)
fmin lower limiting frequency
fmax upper limiting frequency
$\varphi 1$ first phase angle
$\varphi 2$ second phase angle
$\varphi 3$ third phase angle
$\delta s$ minimum loss angle
$\Delta 1$ first minimum deviation
$\Delta 2$ second minimum deviation

The invention claimed is:

1. A method for determining an electrical conductivity of an operating liquid in an operating liquid container for a motor vehicle, wherein the operating liquid container comprises at least one capacitor fastened on a container wall of the operating liquid container having a first electrode and a second electrode opposite thereto, the method comprising:
applying at least three different AC voltages to the at least one capacitor, wherein a first frequency of a first AC voltage corresponds to a lower limiting frequency (fmin), a second frequency of a second AC voltage corresponds to a frequency between the lower limiting frequency (fmin) and an upper limiting frequency (fmax), and a third frequency of a third AC voltage corresponds to the upper limiting frequency (fmax);
determining and storing a first impedance of the at least one capacitor for the first frequency, a second impedance of the at least one capacitor for the second frequency, and a third impedance of the at least one capacitor for the third frequency;
determining a first phase angle ($\varphi 1$) from the first impedance, a second phase angle ($\varphi 2$) from the second impedance, and a third phase angle ($\varphi 3$) from the third impedance; and
determining that an operating liquid located in the operating liquid container meets a quality requirement if the second phase angle ($\varphi 2$) is greater than the first phase angle ($\varphi 1$) and is greater than the third phase angle ($\varphi 3$).

2. The method as claimed in claim 1, further comprising:
outputting a release signal if the second phase angle ($\varphi 2$) is greater than the first phase angle ($\varphi 1$) and is greater than the third phase angle ($\varphi 3$).

3. The method as claimed in claim 1, further comprising:
outputting a warning signal if the third phase angle ($\varphi 3$) is greater than the second phase angle ($\varphi 2$) or is equal to the second phase angle ($\varphi 2$).

4. The method as claimed in claim 1, further comprising:
outputting a stop signal if a difference between the third phase angle ($\varphi 3$) and the first phase angle ($\varphi 1$) is less than a predetermined minimum loss angle ($\delta s$).

5. An operating liquid container comprising:
an operating liquid container interior is delimited by a ceiling wall, a bottom wall, and a side wall connecting the bottom wall to the ceiling wall;
the operating liquid container comprises at least one capacitor fastened to a container wall of the operating liquid container having a first electrode and a second electrode; and
the operating liquid container comprises an electronic evaluation unit, which is electrically connected to the first electrode and to the second electrode,
wherein the electronic evaluation unit is designed to execute the method as claimed in claim 1.

6. The operating liquid container as claimed in claim 5, wherein the at least one capacitor is embedded in the container wall.

7. The operating liquid container as claimed in claim 5, further comprising the following features:
the bottom wall comprises a protrusion extending into the operating liquid container interior; and
the first electrode and the second electrode of the at least one capacitor are embedded in the protrusion.

8. The operating liquid container as claimed in claim 5, further comprising the following features:
the container wall comprises an outer layer, an inner layer facing toward the operating liquid container interior, and an adhesive layer arranged therebetween; and
the first electrode and the second electrode of the at least one capacitor are arranged between the outer layer and the adhesive layer.

9. The operating liquid container as claimed in claim 8, further comprising the following steps:
the container wall comprises a shielding layer and an insulation layer;
the shielding layer is arranged between the outer layer and the first electrode and the second electrode; and
the insulation layer is arranged between the shielding layer and the first electrode and the second electrode.

10. The operating liquid container as claimed in claim 9, wherein the insulation layer has a same dielectric conductivity as the inner layer and/or the outer layer.

11. The operating liquid container as claimed in claim 5, wherein a distance of the first electrode and the second electrode to the operating liquid container interior is between 1.5 mm and 3.5 mm.

12. The operating liquid container as claimed in claim 5, wherein at least one of the first electrode and the second electrode of the at least one capacitor has a nonuniform width extension (B) along a length extension (L) thereof.

13. The operating liquid container as claimed in claim 5, wherein at least one of the first electrode and the second electrode of the at least one capacitor has a width extension (B) increasing in a direction of the bottom wall along a length extension (L) thereof.

* * * * *